US008178055B2

(12) United States Patent
Sinclair et al.

(10) Patent No.: US 8,178,055 B2
(45) Date of Patent: May 15, 2012

(54) MODULAR TEST TUBE RACK

(75) Inventors: James E. Sinclair, Carlsbad, CA (US); Brian Grot, San Diego, CA (US)

(73) Assignee: Vertex Pharmaceuticals, Inc., Cambridge, MA (US)

( * ) Notice: Subject to any disclaimer, the term of this patent is extended or adjusted under 35 U.S.C. 154(b) by 0 days.

(21) Appl. No.: 12/475,381

(22) Filed: May 29, 2009

(65) Prior Publication Data

US 2009/0238727 A1 Sep. 24, 2009

Related U.S. Application Data

(63) Continuation of application No. 10/853,901, filed on May 25, 2004, now Pat. No. 7,553,671.

(51) Int. Cl.
*G01N 21/75* (2006.01)

(52) U.S. Cl. ........ 422/400; 422/560; 422/561; 422/565; 422/500; 422/401; 422/562

(58) Field of Classification Search .................. 422/102, 422/104, 67, 99, 401, 500, 560, 561, 562, 422/565, 400
See application file for complete search history.

(56) References Cited

U.S. PATENT DOCUMENTS

| | | | | |
|---|---|---|---|---|
| 3,713,771 | A | 1/1973 | Taylor et al. | |
| 3,891,140 | A * | 6/1975 | Ayres | 494/12 |
| 3,993,452 | A * | 11/1976 | Moulding | 422/102 |
| 4,295,601 | A | 10/1981 | Cowell | |
| 4,877,659 | A | 10/1989 | Vince | |
| 4,907,893 | A * | 3/1990 | Niemeck et al. | 366/144 |
| 5,256,314 | A | 10/1993 | Driessen | |
| 5,651,941 | A * | 7/1997 | Stark et al. | 422/104 |
| 5,916,527 | A | 6/1999 | Haswell | |
| 6,303,387 | B1 | 10/2001 | Birch et al. | |
| 6,416,455 | B1 | 7/2002 | Aizawa et al. | |
| 6,489,169 | B1 * | 12/2002 | Cohen et al. | 436/47 |
| 7,211,224 | B2 | 5/2007 | Olivier | |
| 2003/0170883 | A1 | 9/2003 | Martin et al. | |

* cited by examiner

*Primary Examiner* — Robert J Hill, Jr.
*Assistant Examiner* — Dwan A Gerido
(74) *Attorney, Agent, or Firm* — Knobbe, Martens, Olson & Bear LLP

(57) ABSTRACT

Disclosed herein is a modular test tube rack. The rack contains multiple sub-racks that can be coupled together to form the test tube rack. The sub-rack can be designed to fit into a variety of scientific instrumentation including a fixed rotor centrifuge. The assembled test tube rack can be of a format and size that allows use of standard array pipetters. Thus, a system is provided allowing use of standard array pipetters and high g centrifugation.

8 Claims, 5 Drawing Sheets

MODULAR TEST TUBE RACK

CROSS REFERENCE TO RELATED APPLICATIONS

This application is a continuation of U.S. application Ser. No. 10/853,901, now U.S. Pat. No. 7,553,671 entitled Modular Test Tube Rack, filed on May 25, 2004. The disclosure of this application is hereby incorporated by reference in its entirety.

BACKGROUND OF THE INVENTION

1. Field of the Invention

The present invention relates to scientific instrumentation. More particularly, the present invention relates to microtiter plates and test tube racks.

2. Description of the Related Art

The standard 96-well test tube racks and 96-well microtiter plates are a workhorse in the life science, biotechnology, and pharmaceutical industry. Under the specifications of the industry standard defined by the Society for Biomolecular Screening (SBS), the 96 wells are arranged in a rectangular matrix of 8 rows×12 columns, with a pitch size of 9 mm. The overall dimensions of the plate are defined by its outer skirt, which is 127.6 mm×85.3 mm. Higher-density plates are based on this basic design, with the outside, skirt dimensions being maintained constant while the pitch size is reduced by ½ for 384-well plates, by ¼ for 1536-well plates and by ⅙ for 3456-well plates.

The usefulness of these items is significantly extended by the existence of array pipetters equipped with 96 or 384 tips that are arranged in rectangular matrices of 8×12 or 16×24 with pitch sizes of 9 mm or 4.5 mm, respectively. With these devices, pipetting into and out of multi-well plates can be done in a parallel, high-throughput fashion. Much of high-throughput screening relies on the joint application of these plate and pipetting technologies.

A drawback with SBS standard devices is that their fixed geometry and size may not be amenable for use with a variety of scientific instrumentation. Thus, there is a need for a more flexible design that still offers the benefits associated with using SBS standard array pipetters.

One example where the size of SBS standard racks and plates limits their use is in centrifugation. In many applications, it is often necessary to centrifuge the tubes or plates. There are numerous centrifuges that work with these devices that use swinging bucket rotors. The plates or racks are deposited into these rotors in the upright position. When the rotor starts spinning, the buckets swing up and the plates or racks are centrifuged horizontally. This technology only allows for low-g centrifugation. These plate centrifuges perform in the range of 2000 g, which is only enough to gently pellet cells. However, in applications where much tighter pellets are required, e.g., clearing of protein precipitates, much higher centrifugation in the range of 10,000-20,000 g is needed. Thus, there is a need for devices and methods that provide the option of high g centrifugation of multiple samples.

SUMMARY OF THE INVENTION

In one embodiment, the invention comprises a modular test tube rack, comprising a first test tube sub-rack configured to hold a plurality of test tubes; and at least one additional test tube sub-rack configured to hold a plurality of test tubes, wherein the additional test tube sub-rack is removably coupled to the first test tube sub-rack.

The invention also comprises a microtiter plate comprising a first section comprising a plurality of wells and a second section comprising a plurality of wells, wherein the second section is removably coupled to the first section.

Preferably, each sub-section of the test tube rack or microtiter plate is adapted to withstand an acceleration of greater than 10,000 g.

The invention further comprises a microtiter plate comprising a plate with a plurality of wells formed therein, the plate constructed of a material adapted to withstand an acceleration of greater than 5000 g. The plate may, for example, be formed from carbon fiber or glass fiber reinforced plastic.

In another embodiment, the invention comprises a method of processing a plurality of samples. The method may comprise pipetting at least a component of the samples into wells on removably coupled sections of a multi-section container, wherein each section comprises a plurality of wells, decoupling the sections from each other, and processing each section.

DETAILED DESCRIPTION OF THE PREFERRED EMBODIMENT

Figure 1A:
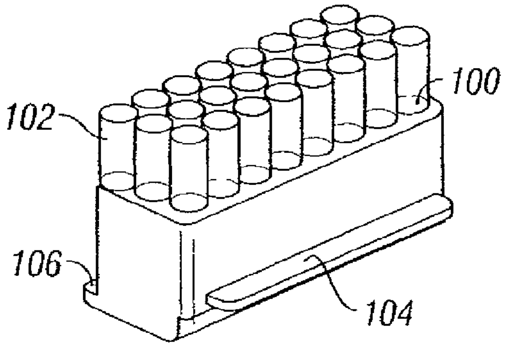
FIGS. 1A and 1B depict a 24-test tube sub-rack.
Figure 1B:
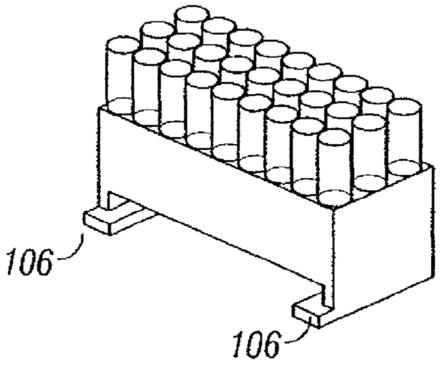

In one embodiment, a modular test tube rack comprises two or more sub-racks, each capable of holding multiple test tubes. One embodiment of a sub-rack is depicted in FIGS. 1A and 1B. The sub-rack has a plurality of holes 100 in which test tubes 102 can be inserted. In the embodiment shown in FIG. 1, the sub-rack holds 24 test tubes. The sub-rack also has a mechanism for removably coupling one sub-rack to another sub-rack. In one embodiment, as illustrated in FIG. 1, the mechanism for coupling sub-racks comprises a tongue 104, a lower flange 106, and a groove 108. When coupling two sub-racks together, the tongue 104 of one sub-rack overlaps with the lower flange 106 of the other sub-rack and fits within the groove. In this manner, multiple sub-racks can be strung together to form a larger test tube rack. It will be appreciated that a wide variety of mechanical couplings could be utilized. As another example, one or more protruding dowels might be provided on the front surface of each sub-rack with mating holes on the rear surface of each sub-rack.

Figure 2A:
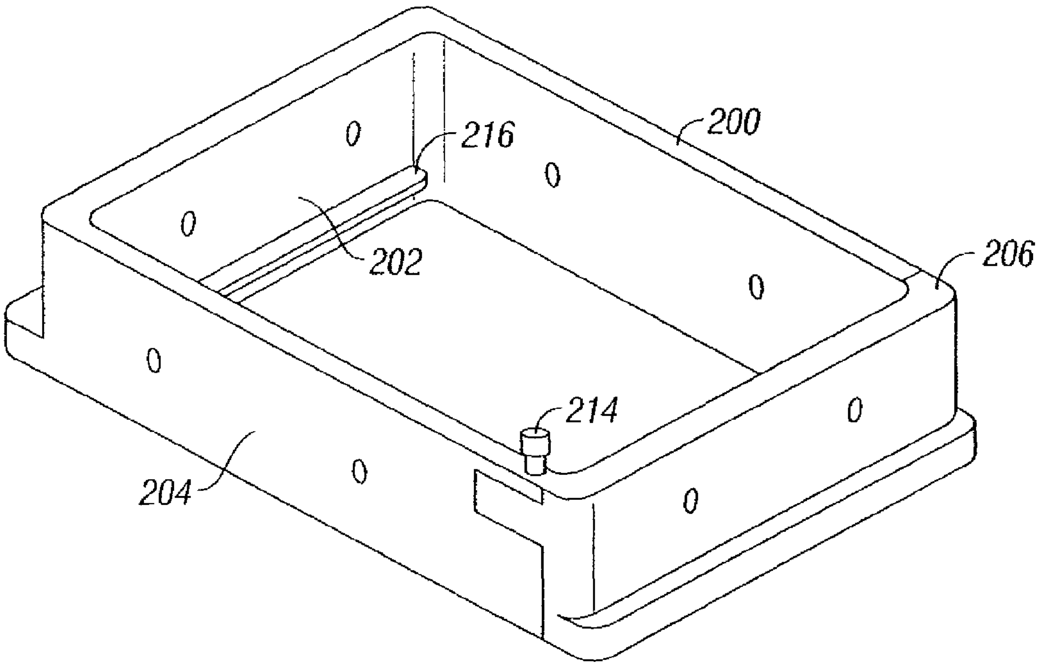
FIGS. 2A and 2B depict a skirt for coupling test tube sub-racks.
Figure 2B:
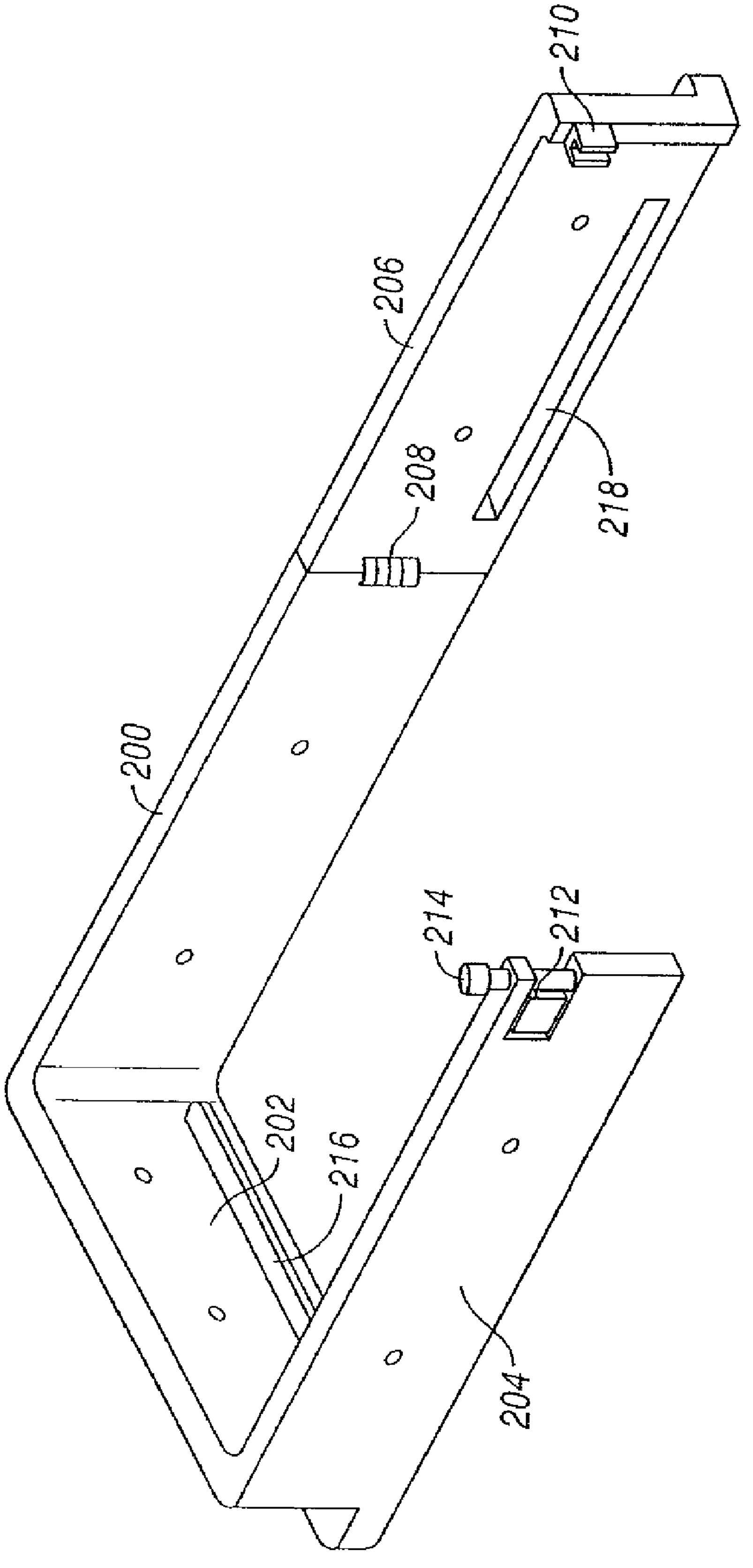
Figure 3:
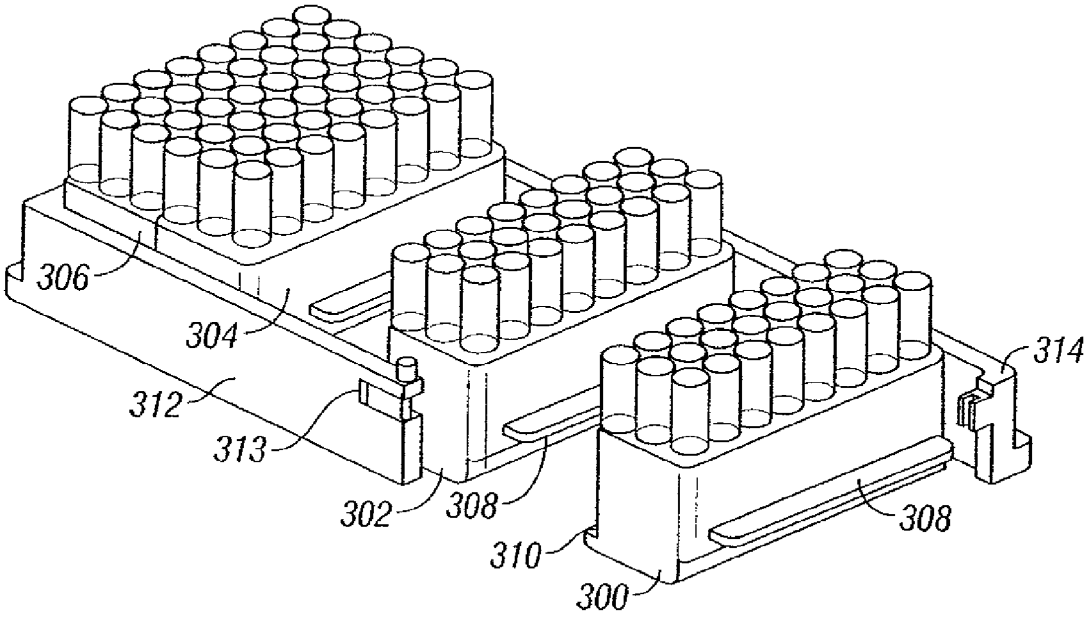
FIG. 3 depicts assembly and disassembly of a modular test tube rack.

In some embodiments, a set of coupled sub-racks is held together as a full test tube rack by a skirt, for example as shown in FIGS. 2A and 2B. As illustrated in FIG. 3, multiple sub-racks may be inserted one at a time into the skirt and coupled via the mechanisms described above. The skirt includes wall 200 that defines the perimeter of the modular test tube rack. The inner side 202 of wall 200 has dimensions such that a certain number of multiple sub-racks coupled together fit within the skirt. In some embodiments, four coupled sub-racks fit within the skirt. In some embodiments, the outer side 204 of wall 200 has dimensions substantially identical to the SAS standard microtiter dimensions—127.6 mm×85.3 mm, such that existing plate handling equipment can be used with the modular rack. The height of the rack assembly is also maintained at an appropriate level for industry standard pipetters can be used without interference with the tops of the tubes. The skirt may be manufactured using any number of materials. In some embodiments, the skirt is constructed from metal, such as aluminum or stainless steel.

Figure 5A:
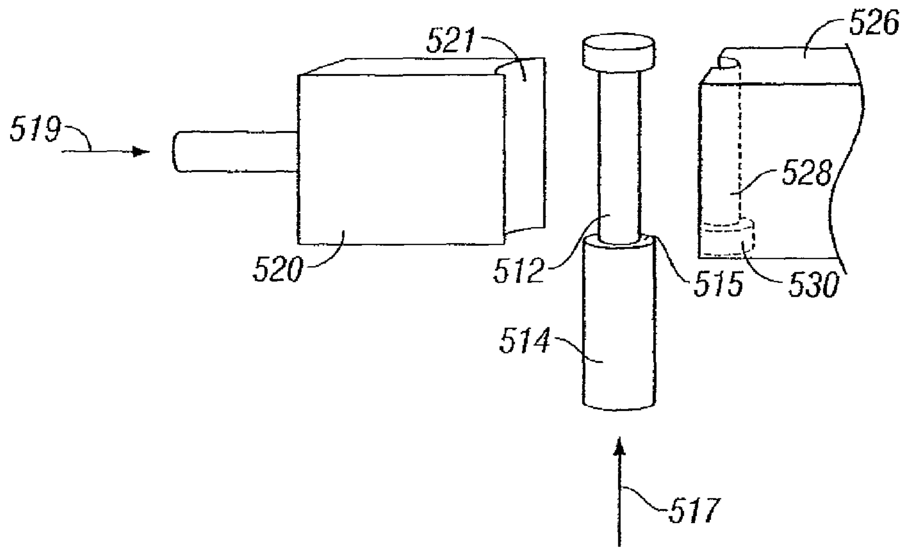
FIGS. 5A-5C depict a latch for the skirt of FIGS. 2A and 2B.
Figure 5B:
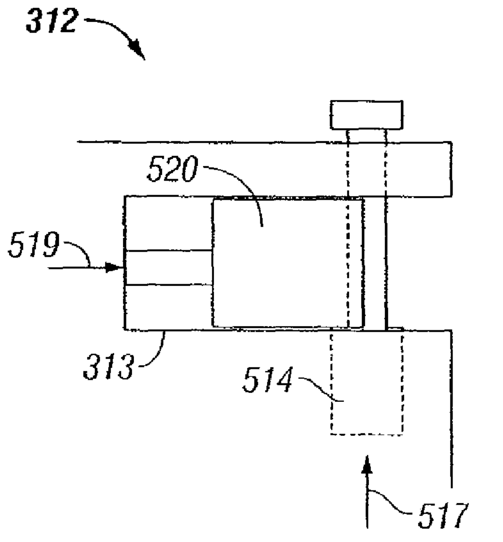
Figure 5C:
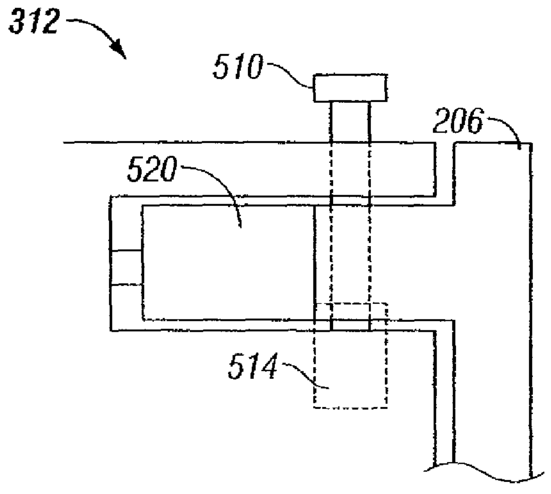

To facilitate assembly and disassembly of the modular test tube rack, the skirt may include a side 206 that is openable. FIG. 2A depicts the skirt when side 206 is closed and FIG. 2B depicts the skirt when side 206 is open. In some embodiments, the side 206 may be completely removable. In other embodiments, as depicted in FIG. 2B, the side 206 may swing open. The swinging action of side 206 may be facilitated by one or more hinges 208. Side 206 may be secured in the closed position by a releasable latch. After being secured in the closed position, release of the latch may be facilitated by release actuator 214. Manipulation of release actuator 214 opens the latch, thereby allowing side 206 to swing open. In some embodiments, the mating mechanisms 210 and 212 couple together by a press fit. In various embodiments, the release actuator 214 may be a button, a quarter-turn release, or a threaded actuator. One specific embodiment of a latch that has been found advantageous is illustrated in FIGS. 5A-C, and is described further below. In any case, any mechanisms known to those of skill in the art for coupling and releasing may be used for the latch and release actuator 214.

Sub-racks are secured within the skirt via a tongue 216 and a groove 218. The tongue 216 is located on the side of the skirt opposite the side 206 that can open. The groove is located within side 206. The tongue 216 fits within the groove of the sub-rack that is placed against the side opposite side 206. The tongue of the sub-rack that is placed next to side 206 fits within groove 218 when the side 206 is closed. In this manner, the sub-racks are secured within the skirt by sequential tongue and groove interaction from tongue 216, through the tongue and grooves coupling each sub-rack to their adjacent sub-racks, to groove 218. Set screws 220 can also be provided which thread inward to press slightly against the sides of the sub-racks so that the fit inside the skirt is snug.

Figure 4:
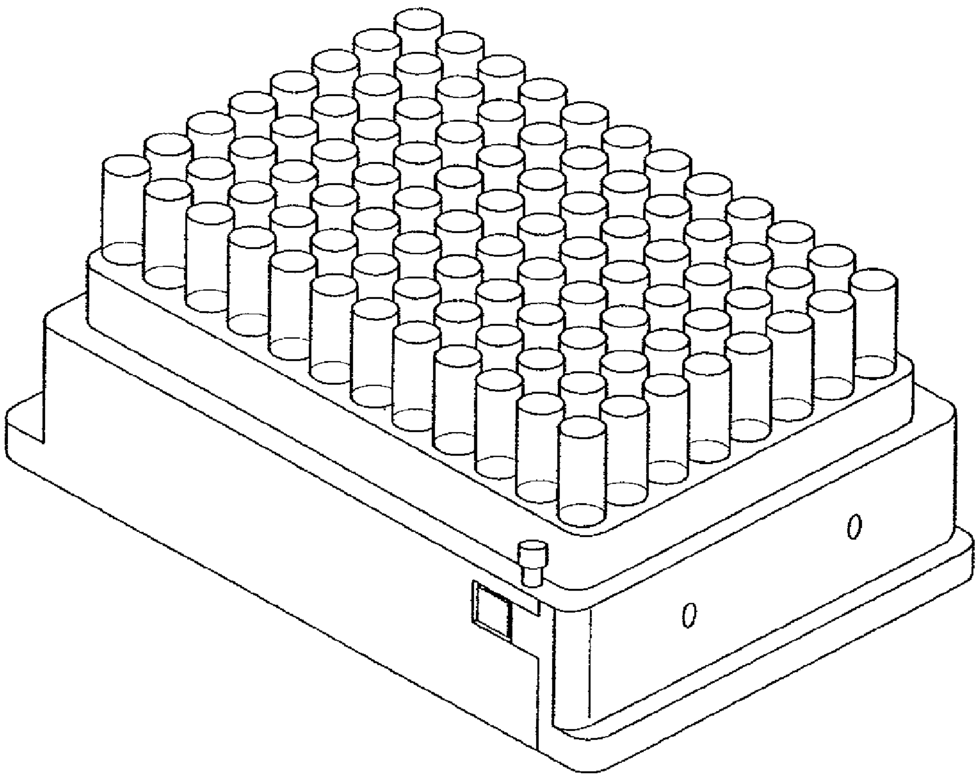
FIG. 4 depicts a fully assembled modular test tube rack.

Assembly and disassembly of the test tube rack is illustrated in FIG. 3. In the embodiment of FIG. 3, four sub-racks, 300, 302, 304, and 306, may be coupled to each other via upper and lower flanges 308 and 310 and grooves (not shown) within skirt 312. After the four sub-racks 300, 302, 304, and 306 are coupled within skirt 312, side 314 of skirt 312 may be closed to form a stable test tube rack, as depicted in FIG. 4. When each sub-rack holds 24 test tubes, the resulting test tube rack contains 96 test tubes. In some embodiments, the geometry of the 96 test tubes in the assembled rack is that of an SBS standard 96-well microtitor plate. This geometry enables the assembled test tube rack to be used with a standard SBS-96 pipette array pipetter.

Returning now to an advantageous latching mechanism for the swinging skirt door 206, FIGS. 5A-5C illustrate one latch embodiment that has been found suitable. The illustrated latch includes a release actuator 214 which includes a head 510, a narrow shaft portion 512, and a thick shaft portion 514. The actuator 214 rests in a vertical hole in the notch 313 (FIG. 3) in the side of the skirt, and is biased upward by an internal spring in the direction of arrow 517. A piston 520 is also provided with a shaft that rests in a horizontal hole in the notch 313 of the skirt. The piston 520 slides back and forth inside the notch 313 between the upper and lower inner surfaces of the notch 313. The piston 520 is spring biased in the direction of arrow 519 toward the release actuator shaft and the opening of the notch When the door is open, a concave piston surface 521 is forced against the narrow shaft portion of the release actuator and the bottom surface of the piston 520 rests on the upper surface 515 of the thicker portion 514 of the release actuator shaft. This prevents the release actuator from moving upward in accordance with its spring bias, and holds the upper surface 515 of the thicker shaft portion flush with the lower internal surface of the notch 313. This configuration is illustrated in FIG. 5B.

When the door is pushed closed, the latch 526 presses against the piston 521, pushing the piston inward toward the rear of the notch and off of the surface 515 of the release actuator. This allows the thicker portion of the release actuator shaft to rise up in the direction of arrow 517, and vertically into an orifice 530 in the bottom of the latch. The center of the orifice 530 is shifted inward from the front surface of the latch by an amount greater than its radius so that the top of the thicker shaft is trapped inside the orifice after the shaft rises up in the direction of arrow 517, thereby engaging the latch 526 to the release actuator and holding the door closed. The upper portion of the latch includes a hemispherical notch 528, in which the thinner portion of the release actuator shaft rests when the door is closed. This configuration is illustrated in FIG. 5C.

To open the door again, the button 510 of the release actuator is pushed down, which pushes the top of the thicker shaft portion out of the orifice. The spring biased piston 520 then pushes the latch 526 away from the release actuator, slides back over the upper surface 515 of the thicker shaft portion of the release actuator and holds the release actuator in the downward position as in FIG. 5B.

Figure 6:
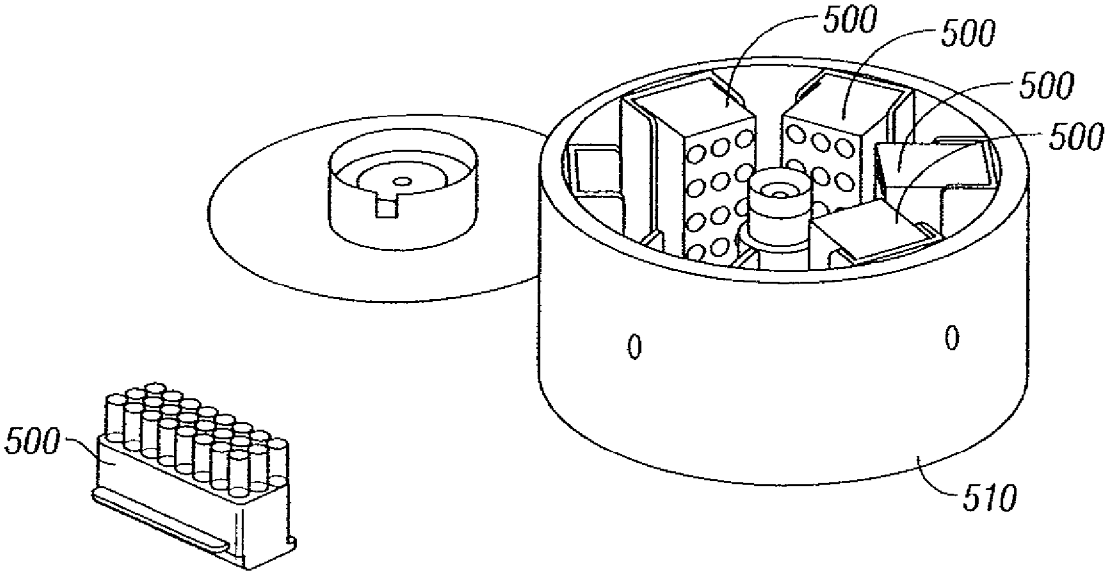
FIG. 6 depicts test tube sub-racks positioned in a fixed rotor centrifuge.
Figure 7:
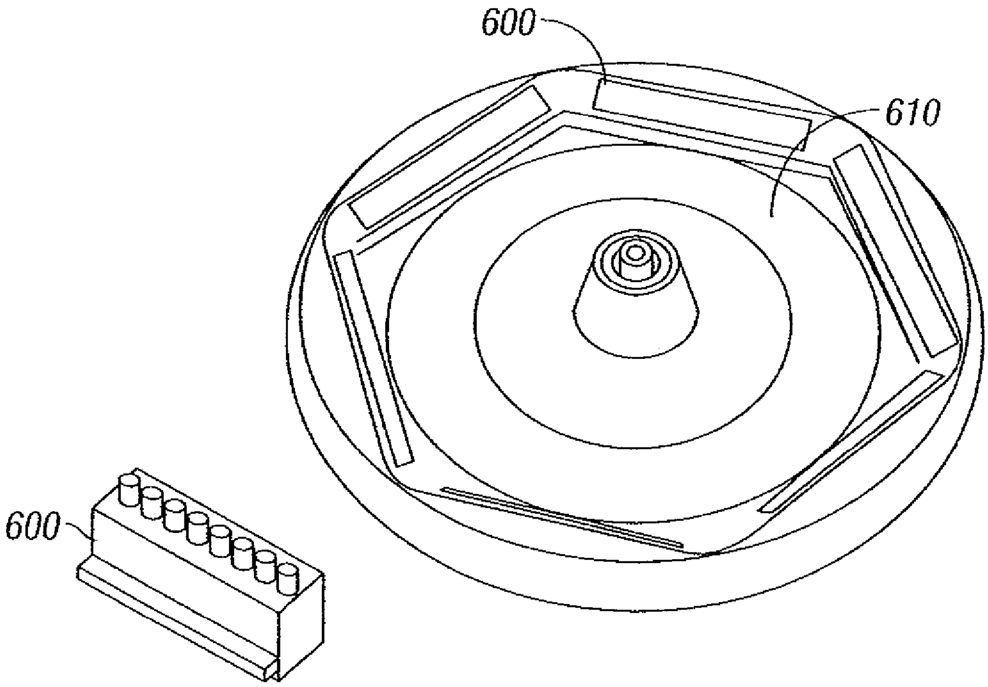
FIG. 7 depicts single row test-tube sub racks positioned in a fixed-angle rotor centrifuge.

A significant benefit of the modular test tube rack described above is that the sub-racks can be made of a size that conveniently fits in a variety of scientific instrumentation. For example, the sub-racks may be made to fit in fixed centrifuge rotors that are commercially available from Eppendorf for example. Prior to the present invention, these fixed rotor designs were used for PCR tubes and the like, but could not be used with SBS standard tube racks or multi-well plates. FIG. 6 depicts sub-racks 500 positioned within a fixed rotor centrifuge 510 of a currently standard design. The bodies of the sub-racks 500 may be manufactured from a material capable of withstanding the high g forces experienced in a fixed rotor centrifuge 510. For example, and as further described below in the context of microtiter plates, the sub-racks 500 may be manufactured from glass-filled nylon and withstand centrifuge acceleration in excess of 10,000 g. When the sub-racks 500 are assembled as depicted in FIG. 4 into a standard SBS geometry, a SBS standard array pipetter may be used to dispense reagents into the test tubes. The test tube rack may then be disassembled, as depicted in FIG. 3, the test tubes capped, and the sub-racks 500 centrifuged in the standard fixed rotor centrifuge as depicted in FIG. 6. After centrifugation, the sub-racks can be reassembled into standard SBS geometry and an array pipetter can be used for further reagent dispensing/withdrawing. It will be appreciated that the sub-racks described herein can be designed to be of a size and geometry suitable for use in any of a variety of scientific instrumentation that does not easily accommodate the full test tube rack size and geometry. Furthermore, the assembled test tube rack may consist of any number of sub-racks and any number of test tubes. In various embodiments, the total number of test tubes are 24, 384, 1536, or 3456. In various embodiments, the number of sub-racks are 2, 3, 4, 6, 8 or 12. In one embodiment, each sub-rack is a single row of test tubes. In this embodiment, each sub-rack (row of test tubes) may have the size and geometry suitable for use in a particular piece of scientific instrumentation. For example, FIG. 7 depicts another commercially available fixed angle centrifuge rotor that is configured to hold PCR tube strips. In one embodiment, a single tube row sub-rack 600 may be designed to fit into slots within this standard fixed-angle rotor 610.

Although the above discussion focuses on a specific embodiment of a test tube rack, in some embodiments, a modular microtiter plate may be created instead of a modular test tube rack. In these embodiments, two or more sub-plates have a coupling mechanism that allows the sub-plates to be coupled together to form a stable microtiter plate. For example, each sub-plate may contain fittings that snap to fittings on another sub-plate. A skirt as described above may also be provided. Thus, the construction of a modular multi-well plate can be performed in a manner analogous to that described in detail above. In some embodiments, the assembled plate has standard SBS size and geometry. Thus, standard SBS array pipetters may be used with the assembled plate, which may then be disassembled into sub-plates of sizes suitable for use in a particular piece of scientific instrumentation, such as a fixed-rotor centrifuge.

In some embodiments, microtiter plates are constructed of materials capable of withstanding the high g forces generated in fixed-rotor centrifuges. For this application, material selection becomes a significant issue. The plates may, for example, by constructed using metal casting followed by machining. Because this would be relatively expensive, it is advantageous to use a plastic material that is sufficiently strong to withstand the forces involved. It is especially advantageous to select a material with a flexural modulus of at least about 5 GPa and/or a flexural strength of at least about 120 MPa, measured in accordance with ASTM D790. Plastics with these high strengths typically are glass fiber or carbon fiber reinforced. Glass or carbon fiber reinforced polyimide is one example of high strength plastic that could be used in this application. In various embodiments, the plates are capable of withstanding accelerations of 5000 g, 8000 g, 10,000 g, 15,000 g, or 20,000 g. In some applications, it may be desirable to place low reflectivity and/or low background fluorescence coatings onto high strength plastic base materials. It also might be desirable to use a different transparent material for the base (glass or clear polycarbonate would be possible options), and a high strength plastic material which may be opaque for the side walls/body of the plate or plate segments.

What is claimed is:

1. A sample holder, comprising:

a skirt, wherein one end of said skirt is formed as a door;

a plurality of separate sample holder portions sized to fit through said door when said door is in the open position, and configured to slide into said skirt; and wherein said skirt comprises mating retainers comprising a tongue and a groove on opposite ends thereof;

wherein each of said separate sample holder portions comprise mating retainers comprising a tongue and a groove on opposite sides thereof;

wherein the mating retainers on said skirt and on each of said sample holder portions are positioned such that each groove on a sample holder portion engages either a tongue on said skirt or a tongue on a different one of said sample holder portions by sliding motion as said sample holder portions are slid into said skirt and said door is closed; and wherein the mating retainers on said skirt and on each of said sample holder portions are positioned such that each tongue on a sample holder portion engages either a groove on said skirt or a groove on a different one of said sample holder portions by sliding motion as said sample holder portions are slid into said skirt and said door is closed.

2. The sample holder of claim 1, comprising a latch configured to hold said door closed.

3. The sample holder of claim 1 comprising four sample holder portions, wherein each of said sample holder portions comprises 24 sample containers.

4. The sample holder of claim 1, wherein said sample holder is configured to withstand centrifuging at an acceleration of greater than 10,000 g.

5. The sample holder of claim 1, wherein the skirt has dimensions substantially identical to 127.6 mm×85.3 mm.

6. The sample holder of claim 1, wherein the total number of sample containers is 24, 96, 384, 1536 or 3456.

7. The sample holder of claim 1, wherein said sample holder portions comprise test tube holders.

8. The sample holder of claim 7, wherein said test tube holders contain test tubes.

* * * * *